United States Patent [19]

Kobayashi et al.

[11] Patent Number: 4,989,038
[45] Date of Patent: Jan. 29, 1991

[54] IMAGE FORMING APPARATUS UTILIZING A LIGHT IMAGE MEMORY

[75] Inventors: Toshiaki Kobayashi; Shougo Iwai, both of Nara, Japan

[73] Assignee: Sharp Kabushiki Kaisha, Osaka, Japan

[21] Appl. No.: 388,947

[22] Filed: Aug. 3, 1989

[30] Foreign Application Priority Data

Aug. 18, 1988 [JP] Japan .................................. 63-204949
Aug. 18, 1988 [JP] Japan .................................. 63-204950
Sep. 2, 1988 [JP] Japan .................................. 63-220788

[51] Int. Cl.$^5$ ......................... G03G 21/00; H04N 1/29
[52] U.S. Cl. ..................................... 355/202; 355/210; 355/235; 358/300
[58] Field of Search ............... 355/202, 210, 211, 228, 355/235, 238; 358/296, 298, 300, 302; 346/160, 107 R, 108

[56] References Cited

U.S. PATENT DOCUMENTS

| | | | |
|---|---|---|---|
| 3,965,476 | 6/1976 | Wenander et al. | 346/108 X |
| 4,075,610 | 2/1978 | Crandall et al. | 346/160 X |
| 4,315,684 | 2/1982 | Sugiura et al. | |
| 4,505,576 | 3/1985 | Sugiura et al. | |
| 4,535,341 | 8/1985 | Kun et al. | 346/108 X |
| 4,659,210 | 4/1987 | Sugiura et al. | 355/40 X |
| 4,697,910 | 10/1987 | Kasuya | |
| 4,733,275 | 3/1988 | Sugiura et al. | 358/300 |
| 4,843,428 | 6/1989 | Sugiura et al. | 358/300 X |
| 4,918,537 | 4/1990 | Mori et al. | 358/300 |

FOREIGN PATENT DOCUMENTS 2543904 4/1977 Fed. Rep. of Germany .
1-180576 7/1989 Japan .
1-243078 9/1989 Japan .

OTHER PUBLICATIONS

European Search Report.
Annex to European Search Report.

Primary Examiner—A. T. Grimley
Assistant Examiner—Matthew S. Smith

[57] ABSTRACT

An image forming apparatus with an image memory plate having a light image memory is disclosed. The light image memory stores image information of a document when reflected light having the image information from the document is projected onto a first surface thereof, and also reads out the image information stored therein in the form of reflected light when light is projected onto a second surface thereof by a light source. The image forming apparatus comprises a movable holder for detachably holding the image memory plate.

30 Claims, 6 Drawing Sheets

IMAGE FORMING APPARATUS UTILIZING A LIGHT IMAGE MEMORY

BACKGROUND OF THE INVENTION

1. Field of the Invention

The present invention relates to an image forming apparatus for forming an image of image information, in accordance with light having the image information such as light reflected from a document, and more particularly to an image forming apparatus utilizing a light image memory for storing the image information temporarily.

2. Description of the Related Art

Recently, an image forming apparatus such as an electrophotographic copying machine has been implemented with various kinds of functions such as multiple copying, both side copying, composite copying etc.

Generally, the conventional copying machine has a document scan type optical system comprising a scanner movable along a document set on a document table, wherein light reflected from the document is projected onto a photoconductive drum through mirrors and lenses. Therefore, in the optical system, it is necessary to scan the whole area of the document once in order to produce a copy of the document. In order to produce plural copies of the document, it is necessary to scan the document a number of times repeatedly corresponding to the number of copies, resulting in that it takes a long time to produce those plural copies. In this case, each time the document is scanned, a return time required for the scanner to return from the end position of the scanner in the scan operation to an original position thereof tends to take a longer time.

Furthermore, after plural copies of a set of documents are produced, the produced plural copies are discharged every set of documents in the order of the documents by using either of the following apparatuses:

(1) a sorter for discharging each set of copied papers corresponding to each set of documents, to each of plural trays, respectively.

(2) a document circulation type automatic feeding apparatus for producing plural copies of documents by circulating the documents a number of times corresponding to the number of copies.

However, such a problem is caused that the copying machine comprising the sorter becomes large, and also, in the copying machine comprising the above automatic feeding apparatus such a problem is caused that the document is damaged easily.

In order to solve the above problems, there has been proposed an automatic document processing apparatus in the Japanese Laid-open Patent Publication (JP-A) No. 140542/1979. There has also been proposed a method for projecting reflected light of an image written in a light image memory which is arranged on each surface of a regular polyhedron member so as to form an electrostatic latent image on a photoconductive body in the Japanese Laid-open Utility Model Publication (JP-A) No. 139852/1979. In former apparatus, an image of a document is temporarily written in a light image memory including liquid crystal, an electrochromic material, PLZT (compound of Pb, La, Zr and Ti), and thereafter, the image of the document is read out from the light image memory, and it is recorded onto a recording body, or an electrostatic latent image corresponding to the image of the document is formed onto a photoconductive body.

However, when image information is written in the aforementioned light image memory and is read out therefrom many times repeatedly, the performance of writing image information and the performance of storing image information deteriorate, resulting in that the image information may not be stored therein properly.

Furthermore, since the aforementioned light image memory can store image information for a certain time, the same image can be repeatedly formed thereon to make plural copies. However, on the contrary, there is a possibility of leaking image information of a secret document.

Furthermore, foreign matter such as dust may adhere to the aforementioned light image memory, and then, the image of the dust is formed as an image defect with the image of the document to be formed. Particularly, in the case that the aforementioned light image memory is mounted detachably to the main body of the copying machine so as to exchange it for another light image memory having photosensitivity characteristics, dust may adhere to the detached light image memory and also the surface thereof may be marred, resulting in that they are formed as an image defect thereon.

In the aforementioned copying machine, the reflected light from the document is projected onto the photoconductive body so as to form an electrostatic latent image thereon. For example, in the case of a photoconductive body having a photoconductive layer, after the surface of the photoconductive body has been uniformly electrified, the reflected light from the document is projected on to the photoconductive layer. Then, the resistance of the photoconductive layer onto which the reflected light is projected decreases, and part of the charge on the surface thereof is canceled so as to form an electrostatic latent image on the photoconductive body. Thereafter, generally, toner is applied to a portion where the charge has not been canceled, i.e., the reflected light has not been projected, to render the latent image to be developed into a visible toner image.

However, in the case that the image is formed by using the aforementioned light image memory, toner may adhere to the circumference of the image forming portion. This is caused because of the following reason. Since light is not projected onto the circumference of the image forming portion, the charge on the surface thereof is not canceled, resulting in that excessive toner may adhere to the circumference of the portion (the image forming portion) corresponding to the light image memory. If a sheet of paper onto which the toner image is transferred has approximately the same size as that of the light image memory, the excessive toner remains on the photoconductive body, and then, the excessive toner is abandoned. On the other hand, if the size of the paper is larger than that of the light image memory, the excessive toner is transferred onto the paper, and then, the excessive toner image having a frame shape is formed in the circumference of the image forming portion. Furthermore, when the excessive toner is used for each image formation, such a problem is caused that the cost required for forming the image increases.

SUMMARY OF THE INVENTION

An essential object of the present invention is to provide an image forming apparatus comprising an image memory plate having a light image memory to which the image memory plate is detachably mounted so as to exchange it easily, and also to prevent image information of a secret document from leaking.

Another object of the present invention is to provide an image forming apparatus comprising a light image memory which is able to protect the light image memory.

A further object of the present invention is to provide an image forming apparatus comprising a light image memory which is able to prevent excessive toner from adhering to a circumference of an image forming portion.

According to one aspect of the present invention, there is provided an image forming apparatus comprising:

an image memory plate having a light image memory for storing image information of a document when reflected light having the image information from the document is projected onto a first surface thereof, and for reading out the image information stored therein in the form of reflected light when light is projected onto a second surface thereof by a light source;

a holder means for detachably holding the image memory plate;

a moving means for moving said holder means so as to project the reflected light from the document onto the first surface of said light image memory and to project the light from said light source onto the second surface of said light image memory; and image formation means for forming the image of the image information onto a paper in accordance with the reflected light from said light image memory.

According to another aspect of the present invention, there is provided an image forming apparatus comprising:

an image memory plate having a light image memory for storing image information of a document when reflected light having the image information from the document is projected onto a first surface thereof through a first lens, and for reading out the image information stored therein in the form of reflected light when light is projected onto a second surface thereof by a light source;

a holder means for detachably holding the image memory plate;

a moving means for moving said holder means so as to project the reflected light from the document onto the first surface of said light image memory and to project the light from said light source onto the second surface of said light image memory;

image formation means for forming the image of the image information onto a paper in accordance with the reflected light from said light image memory through a second lens;

a first transparent protection cover for protecting the first surface of said light image memory, said first transparent protection cover being arranged at a distance from the first surface of said light image memory larger than the depth of focus of said first lens; and a second transparent protection cover for protecting the second surface of said light image memory, said second transparent protection cover being arranged at a distance from the second surface of said light image memory larger than the depth of focus of said second lens.

According to a further aspect of the present invention, there is provided an image forming apparatus comprising:

an image memory plate having a frame member and a light image memory for storing image information of a document when reflected light having the image information from the document is projected onto a first surface thereof, and for reading out the image information stored therein in the form of reflected light when light is projected onto a second surface thereof by a light source, said light image memory being mounted in said frame member, a surface of said frame member on the side of the second surface of said light image memory being made of a light reflection material;

a holder means for detachably holding the image memory plate;

a moving means for moving said holder means so as to project the reflected light from the document onto the first surface of said light image memory and to project the light from said light source onto the second surface of said light image memory; and image formation means for forming the image of the image information onto a paper in accordance with the reflected light from said light image memory.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

These and other objects and features of the present invention will become clear from the following description taken in conjunction with a preferred embodiment thereof with reference to the accompanying drawings which are given by way of illustration only, and thus are not limitative of the present invention, and wherein.

DETAILED DESCRIPTION OF THE PREFERRED EMBODIMENT

Figure 1:
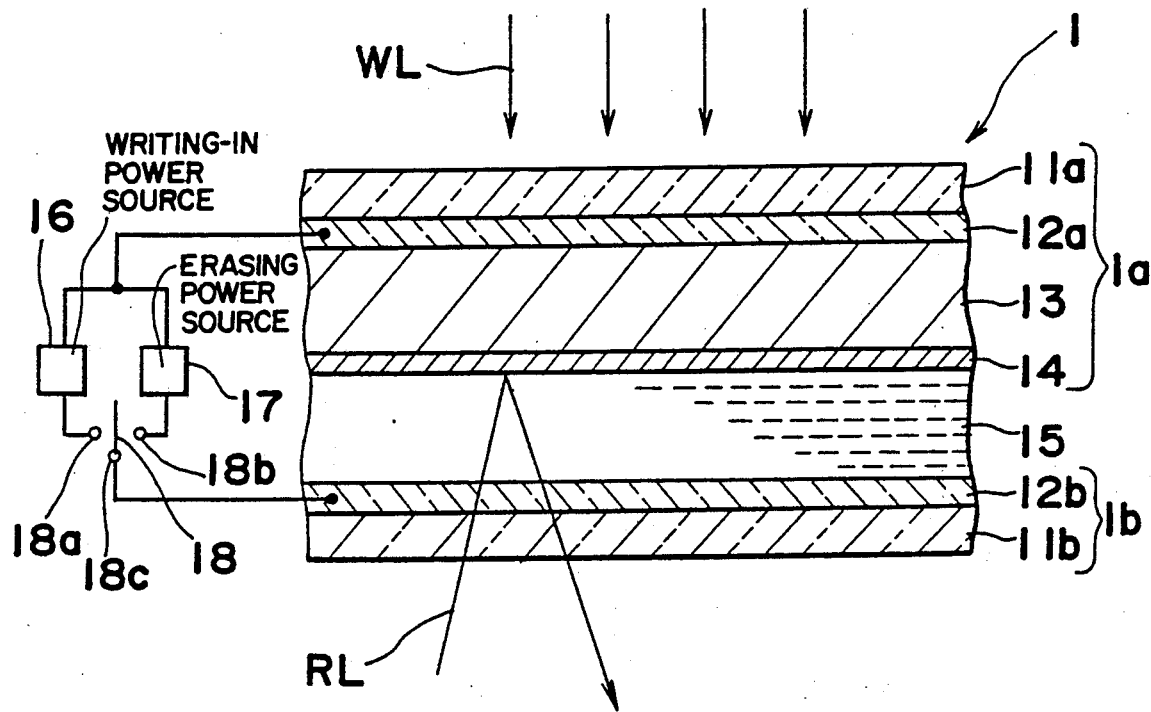
FIG. 1 is a schematic longitudinal sectional view showing a light image memory of one preferred embodiment according to the present invention.

The preferred embodiment according to the present invention will be described below in the order of the following items with reference to the attached drawings:

(1) Composition of Light Image Memory
(2) Action of Light Image Memory
(3) Composition of Copying Machine with Light Image Memory
(4) Action of Copying Machine with Light Image Memory
(5) Other Modifications (1) Composition of Light Image Memory Referring to FIG. 1, a light image memory 1 is comprised of an upper base 1a, a lower base 1b, and a liquid crystal layer 15 made of ferroelectric liquid crystal which is arranged between the bases 1a and 1b. The upper base 1a is comprised of a glass substrate 11a, a transparent electrode 12a made of an electrically conductive material such as ITO, or indium tin oxide, which is formed on the bottom surface of the glass substrate 11a, a photoconductive layer 13 formed on the bottom surface of the transparent electrode 12a, and a reflection layer 14 formed on the bottom surface of the photoconductive layer 13. The lower base 1b is comprised of a glass substrate 11b, and a transparent electrode 12b made of an electrically conductive material such as ITO which is formed on the top surface of the glass substrate 11b.

The transparent electrode 12a is connected to one terminal of a writing-in power source 16 for applying a predetermined direct-current voltage to the photoconductive layer 13 so as to write image information therein as described in detail later, and one terminal of an erasing power source 17 for applying a predetermined alternating-current voltage to the photoconductive layer 13 so as to erase the image information written therein as described in detail later. On the other hand, the transparent electrode 12b is connected to a common terminal 18c of a switch 18. A first terminal 18a of the switch 18 is connected to another terminal of the writing-in power source 16, and a second terminal 18b of the switch 18 is connected to another terminal of the erasing power source 17. The switch 18 is switched over so that the common terminal 18c thereof is selectively connected to either of the first terminal 18a or the second terminal 18b, and therefore, either of the writing-in power source 16 or the erasing power source 17 is selectively connected to the transparent electrodes 12a and 12b. It is to be noted that, in the present preferred embodiment, the writing-in power source 16 is a direct-current power source, and the erasing power source 17 is an alternating-current power source. However, suitable power sources may be used as power sources 16 and 17, respectively, depending on the type of the liquid crystal layer 15, the type of the photoconductive layer 13, and the thickness of the liquid crystal layer 15.

The aforementioned photoconductive layer 13 is made of an inorganic photoconductive material such as CdS, CdSe, $As_2Se_3$, SeTe, amorphous silicon, amorphous germanium etc., or an organic photoconductive material such as polyvinyl carbazole, trinitrofluorenon, etc. When light is projected onto those photoconductive materials, the resistance thereof decreases.

Since the liquid crystal layer 15 is made of ferroelectric liquid crystal as described above, dielectric polarization is caused in the crystal layer 15 when a predetermined electric field is applied to the layer 15, and thereafter, the dielectric polarization still remains even though the electric field is removed. Furthermore, the polarity of the dielectric polarization is reversed by reversing the direction of the electric field to be applied to the layer 15. Concretely, smectic C phase liquid crystal, nematic-cholesteric fixed liquid crystal, etc., are provided as the aforementioned ferroelectric liquid crystal. In the present preferred embodiment, a fixed liquid crystal comprised of 5% cholesteric liquid crystal and 95% nematic liquid crystal is used.

Furthermore, the reflection layer 14 shields light projected from the upper side above the glass substrate 11a so as to prevent the light from passing through the liquid crystal layer 15 and the base 1b, and also reflects light projected from the lower side below the glass substrate 11b. Furthermore, the reflection layer 14 prevents the photoconductive layer 13 and the liquid crystal layer 15 from being in contact with each other so as to prevent any chemical reaction from occurring between both of the layers 13 and 15.

(2) Action of Light Image Memory

Figure 2:
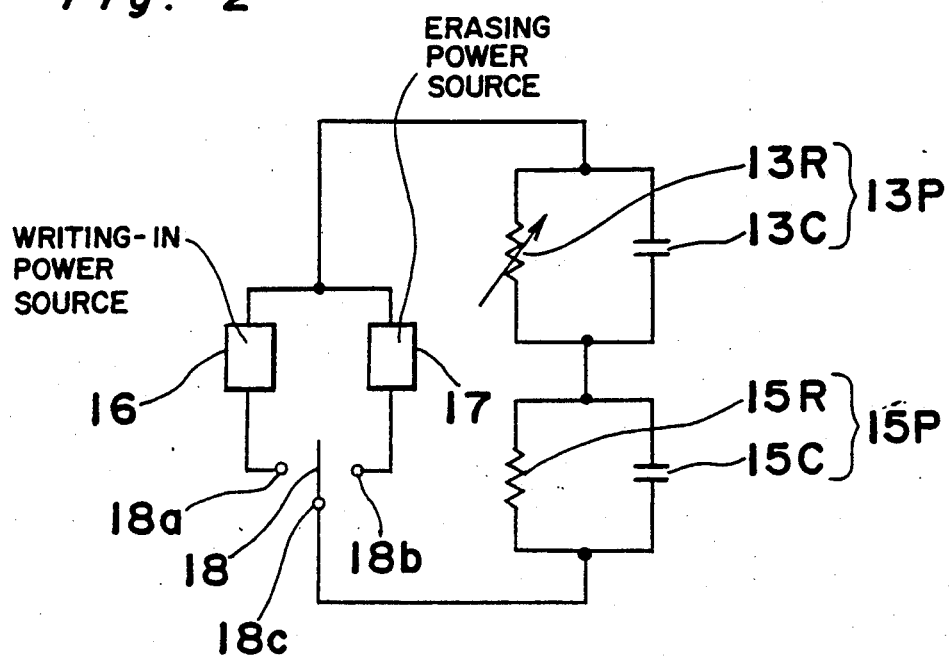
FIG. 2 is a circuit diagram of an equivalent circuit of the light image memory shown in FIG. 1.

In FIG. 2, 13R and 13C denote the resistance and the capacitance of the photoconductive layer 13, respectively, which are connected in parallel to each other so as to form a parallel circuit 13P, and 15R and 15C denote the resistance and the capacitance of the liquid crystal layer 15, respectively, which are connected in parallel to each other so as to form a parallel circuit 15P. The parallel circuits 13P and 15P are connected in series with each other, and the parallel circuits 13P and 15P connected in series with each other are selectively connected to either of the writing-in power source 16 or the erasing power source 17 through the switch 18.

When writing-in light WL having image information such as reflected light from a document, etc., is projected onto the top surface of the light image memory 1 from the upper side above the glass substrate 11a (referred to as a writing-in side hereinafter), the resistance 13R of the photoconductive layer 13 at the portion onto which the writing-in light WL is projected (referred to as a light projected portion hereinafter) decreases so that the electric field applied to a first portion of the liquid crystal layer 15 facing the light projected portion of the photoconductive layer 13 increases, resulting in that dielectric polarization is caused at the first portion of the liquid crystal layer 15. Then, the light transmittance of the first portion of the liquid crystal layer 15 decreases since the light projected thereonto is scattered. On the other hand, the resistance 13R of the photoconductive layer 13 at the portion onto which the writing-in light WL is not projected (referred to as a not projected portion hereinafter) does not vary so that the electric field applied to a second portion of the liquid crystal layer 15 facing the non-projected portion of the photoconductive layer 13 does not vary, resulting in that the above dielectric polarization is not caused at the second portion of the liquid crystal layer 15, and the light transmittance of the second portion of the liquid crystal layer 15 does not vary. Thus, the light transmittance of the first portion of the liquid crystal layer 15 facing the light projected portion of the photoconductive layer 13 becomes lower than that of the second portion of the liquid crystal layer 15 facing the non-projected portion of the photoconductive layer 13. That is, when the writing-in light WL having image information is projected onto the top surface of the light image memory 1 from the writing-in side, the light transmittance of the first portion of the liquid crystal layer 15 facing the light projected portion of the photoconductive layer 13 varies, resulting in that the image information is written in the light image memory 1.

Thereafter, when reading-out light RL is projected onto the light image memory 1 from the lower side below the glass substrate 11b (referred to as a reading-out side hereinafter) by a light source, the projected reading-out light RL passes through the second portion of the liquid crystal layer 15 where the light transmittance thereof has not varied in the above process since the light transmittance thereof is higher than that of the first portion of the liquid crystal layer 15 where the light transmittance thereof has varied, and is reflected by the reflection layer 14. On the other hand, the projected reading-out light RL is scattered at the first portion of liquid crystal layer 15 where the light transmittance thereof has varied. Then, the light which has been reflected by the reflection layer 14 and has not been reflected becomes an image information light, and is projected onto a photoconductive body such as a photoconductive drum of an electrophotographic copying machine so as to form an electrostatic latent image thereon.

In the case that the image information written in the light image memory 1 is erased, when light is projected onto the whole bottom surface of the light image memory 1 from the writing-in side on condition that the erasing power source 17 is connected to the transparent electrodes 12a and 12b, a predetermined alternating-current electric field is applied to the whole surface of the liquid crystal layer 15, and then, the light transmittance of the first portion of the liquid crystal layer 15 increases and becomes substantially the same as that of the second portion of the liquid crystal layer 15 where the light transmittance thereof has not varied, resulting in that the image information which has been written therein is erased.

It is to be noted that the liquid crystal layer 15 is a storage type liquid crystal layer, that is, image information which has been written therein is not erased even though connection between the writing-in power source 16 and the transparent electrodes 12a and 12b is canceled, and therefore, the image information can be stored in the light image memory 1 for a long time. Due to this, it is not necessary to provide a power source for storing image information in the light image memory 1. In the light image memory 1, an electrochromic material, PLZT, a compound of lead, lanthanum, zirconium, and titanium, etc. having an action for storing image information may be used instead of the aforementioned liquid crystal.

(3) Composition of Copying Machine with Light Image Memory

Figure 3:
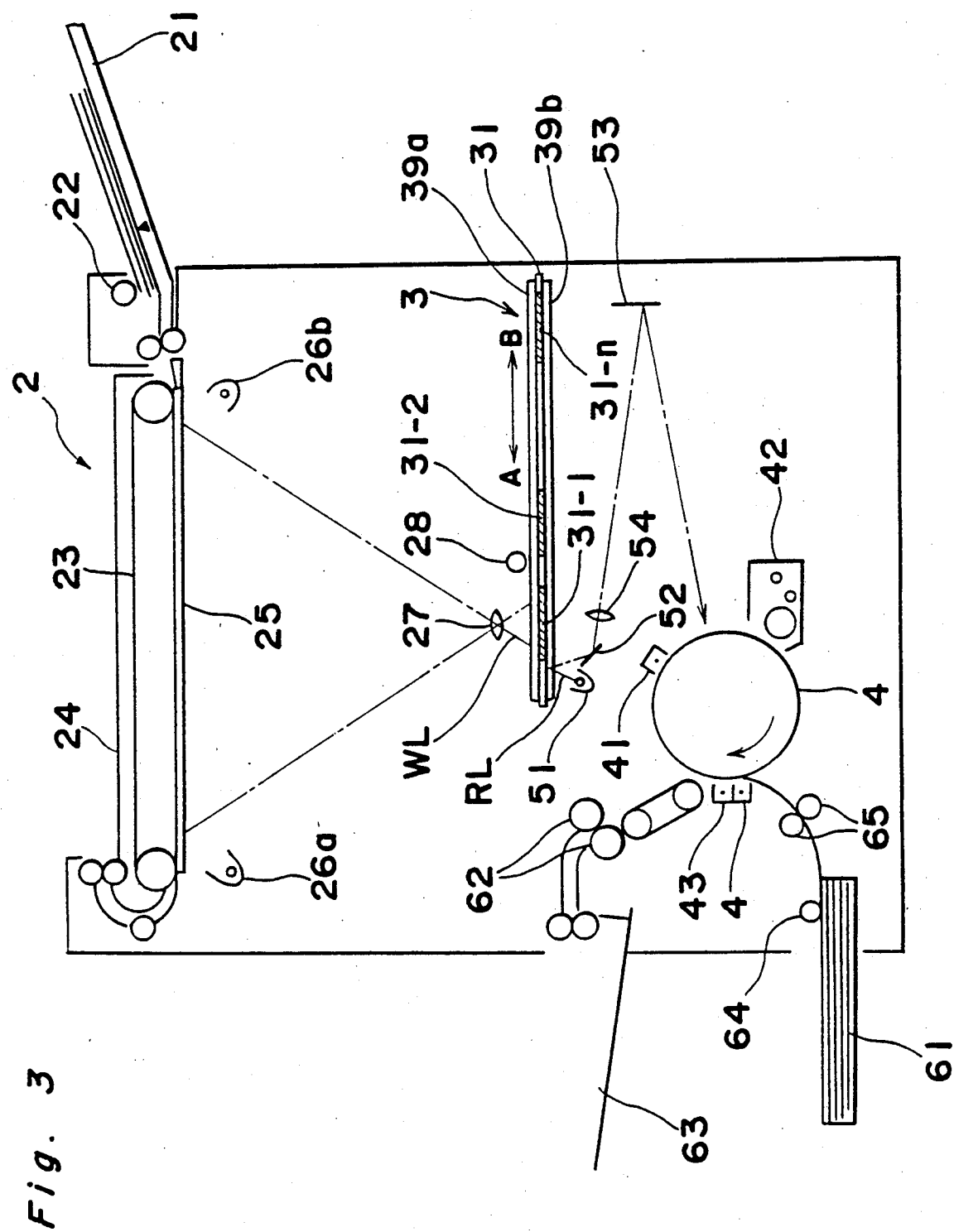
FIG. 3 is a schematic longitudinal sectional view showing a copying machine comprising an image memory plate of the preferred embodiment according to the present invention.

FIG. 3 shows an electrophotographic copying machine comprising an image storage unit 3 having an image memory plate 31 with a plurality of light image memories 31-1 to 31-n respectively having the same composition as that of the aforementioned light image memory 1.

Referring to FIG. 3, an automatic document feeding apparatus (referred to as an ADF hereinafter) 2 is arranged on the top surface of the main body of the copying machine. The ADF 2 comprises a document feeding tray 21, a feeding roller 22, a transportation belt 23, a paper discharging tray 24, etc. Documents to be copied are set on the document feeding tray 21 so that each surface thereof on which an image is formed (referred to as an image surface hereinafter) faces the top surface of the document feeding tray 21, and the documents are fed from the top document one by one by the feeding roller 22. The document fed by the feeding roller 22 is transported by the transportation belt 23 so that it is set on a document table 25. Thereafter, light is projected onto the image surface of the document set thereon by an image writing-in optical system as described later, and the reflected light from the document (referred to as a document reflected light hereinafter) is projected onto the top surface of the light image memory 1 of the image storage apparatus 3. Thereafter, the document onto which the light has been projected is discharged to the paper discharging tray 24 by the transportation belt 23.

Figure 4:
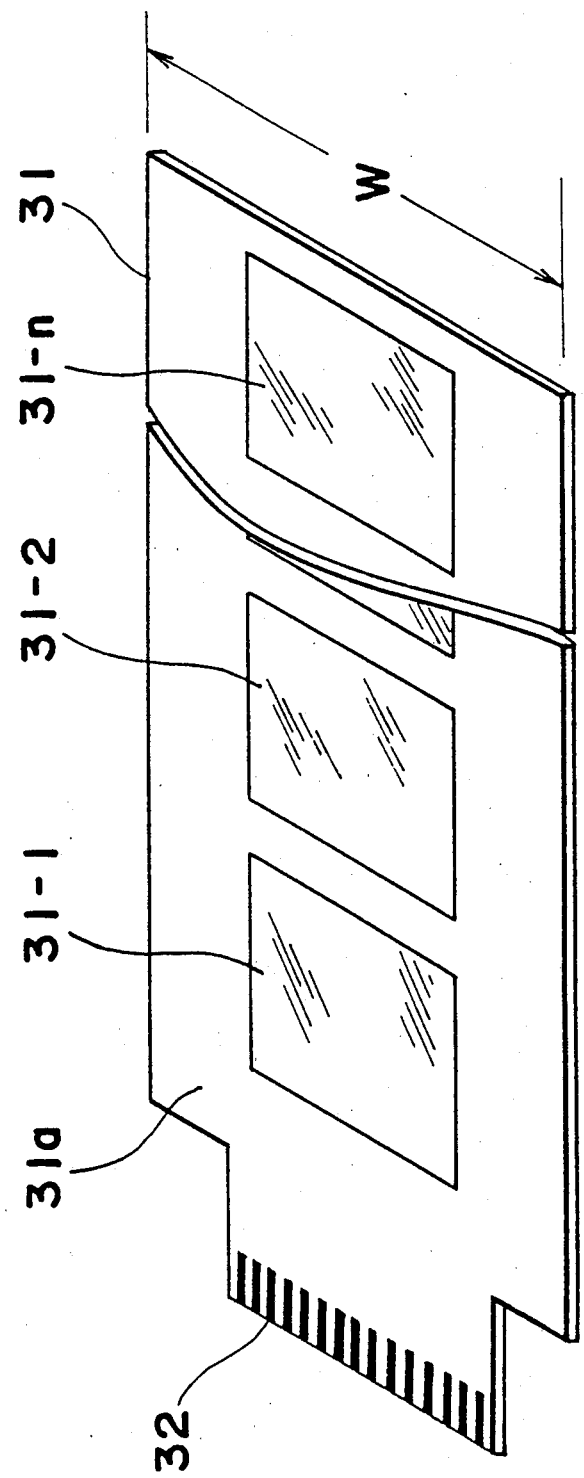
FIG. 4 is a perspective view showing the image memory plate shown in FIG. 3.
Figure 5:
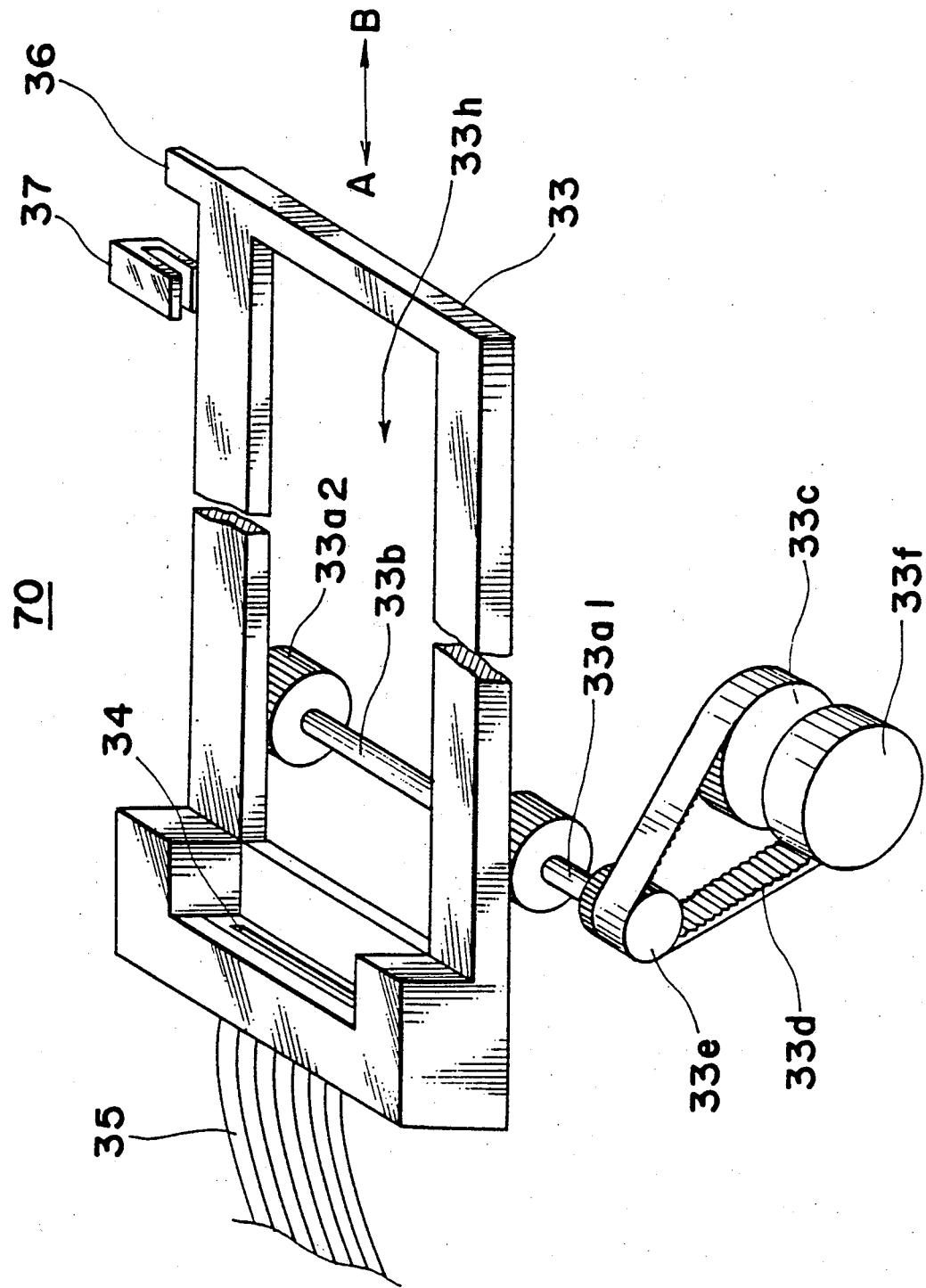
FIG. 5 is a perspective view showing a holder for holding the memory plate shown in FIG. 4.

The image storage unit 3 comprising the image memory plate 31 is arranged in the center portion of the copying machine. Referring to FIGS. 4 and 5, the image storage unit 3 comprises the image memory plate 31 having a plurality of the light image memories 31-1 to 31-n, and a holding unit 70 for detachably holding the image memory plate 31 and moving the plate 31 in directions respectively indicated by arrows A and B as shown in FIG. 5.

Referring back to FIG. 3, below the document table 25, there is arranged the image writing-in optical system comprising light sources 26a and 26b, and a lens 27. Light is projected onto a document set on the document table 25 by the light sources 26a and 26b, and the light reflected from the document is projected onto the top surface of the image memory plate 31 of the image storage unit 3 through the lens 27. Furthermore, above the image storage unit 3, there is arranged an erasing lamp 28 for erasing image information written in the light image memory 1.

Referring back to FIG. 4, the image memory plate 31 comprises a frame member 31a, a plurality of the light image memories 31-1 to 31-n embedded in the frame member 31a, and electrodes 32 arranged at one end portion of the frame member 31a. The top surface of the frame member 31a corresponds to the aforementioned writing-in side, and the bottom surface thereof corresponds to the aforementioned reading-out side. The top surface of the frame member 31a is formed so as to absorb light, and the bottom surface thereof is formed so as to reflect light. For example, the frame member 31a is constituted by a metal plate made of Al, etc., which is capable of reflecting light like a mirror, and only the top surface thereof is coated with black color paint. Therefore, light is absorbed by the top surface of the frame member 31a so as to prevent the reflected light from the top surface thereof from being incident onto the light image memories 31-1 to 31-n as a stray light. On the other hand, light is totally reflected by the bottom surface of the frame member 31a so as to completely cancel the charge on the circumferences of the light image memories 31-1 to 31-n upon forming an electrostatic latent image on a photoconductive drum 4 by the reflected light from one of the light image memories 31-1 to 31-n. It is to be noted that the width W of the frame member 31a is approximately the same as that of the photoconductive drum 4, and then, the reflected light from one of the light image memories 31-1 to 31-n is projected onto the surface of the photoconductive drum 4 almost completely in the direction of the width thereof (the longitudinal direction thereof), and the reflected light from the frame member 31a can be prevented from being incident to the other portion of the copying machine as a stray light. Furthermore, another frame member may be used as the frame member 31a on condition that the top surface thereof absorbs light and the bottom surface thereof reflects light as follows. A frame member made of a synthetic resin may be shaped, and the top surface thereof may be coated with black color paint or a black synthetic plate may be stuck to the top surface of the frame member. The bottom surface of the frame member may be metal-plated, or an Al sheet for reflecting light like a mirror is stuck to the bottom surface thereof. It is to be noted that the light reflectance of the bottom surface of the frame member 31a is preferably almost the same as that of the reflection layer 14 of the light image memories 31-1 to 31-n.

As described above, the light image memories 31-1 to 31-n comprise the photoconductive layer 13 and the liquid crystal layer 15. When the document reflected light is projected thereonto from the writing-in side, the light transmittance of the portion of the liquid crystal layer 15 facing the light projected portion of the photoconductive layer 13 decreases so as to form an image on the liquid crystal layer 15. Respective light image memories 31-1 to 31-n are made so that the size thereof is substantially coincident with the maximum one of respective sizes of the documents to be set on the document table 25, and the image writing-in optical system is provided so that the size thereof is substantially coincident therewith. For example, in the copying machine of the present preferred embodiment, the maximum one of the documents to be set on the document table 25 has a size of A3, maximum A3 size of respective images are written in the light image memories 31-1 to 31-n, respectively, by projecting the document reflected light thereonto by the image writing-in optical system. The image memory plate 31 is moved in the direction indicated by the arrows A and B shown in FIGS. 3 and 5 by the holding unit 70 described in detail later, so that one of the light image memories 31-1 to 31-n is positioned at an image forming position at which an image is formed by the aforementioned image writing-in optical system, and at an exposure position at which light is projected by a reading-out optical system described in detail later, and then, image information is written in one of the light image memories 31-1 to 31-n or is read out therefrom.

As described above, the electrodes 32 are arranged at one end portion of the image memory plate 31. In the image memory plate 31, the electrodes 32 are connected to the transparent electrodes 12a and 12b of respective light image memories 31-1 to 31-n, respectively, and also the electrodes 32 are connected to the writing-in power source 16 or the erasing power source 17 through the switch 18 as described above.

The image memory plate 31 is mounted in the holding unit 70 shown in FIG. 5. The holding unit 70 comprises a holding member 33 having a window frame shape with rectangular opening 33h, and the aforementioned image memory plate 31 is embedded the opening 33h of the holding member 33 in such a manner that the image memory plate 33 bites the opening 33h so that it is installed at a predetermined position thereof. A connector 34 for connecting the aforementioned electrodes 32 with the writing-in power source 16 or the erasing power source 17 through a flat cable 35 is arranged at one end portion of the holding member 33.

Below the holding member 33, there are arranged cylindrical driving rollers 33a1 and 33a2 so that engaging gears formed on the outer cylindrical surface of the driving rollers 33a1 and 33a2 are engaged in engaging portions (not shown) formed on the bottom surface of the holding member 33 respectively. Not only the rollers 33a1 and 33a2, but also a belt pully 33e are connected to a shaft 33b, and a belt 33d is tensed by the belt pully 33e and another belt pully 33c which is connected to a motor 33f. When the motor 33f is rotated, the driving force thereof is transmitted to the belt pully 33e through the belt pully 33c and the belt 33d, and then, the belt pully 33e, and the rollers 33a1 and 33a2 are rotated so that the holding member 33 comprising the image memory plate 31 is moved in the directions respectively indicated by the arrows A and B in FIG. 5. A detecting piece 36 for detecting the position of the holding member 33 is arranged integrally with the holding member 33 at the edge portion thereof, and a photosensor 37 for detecting the detecting piece 36 is arranged so as to face the detecting piece 36 at a predetermined reference position of the image memory plate 31. When the photosensor 37 detects the detecting piece 36, the image memory plate 31 is positioned at the reference position, and then, the writing-in light WL (the document reflected light) is projected onto the top surface of the light image memory 31-1 by the image writing-in optical system, and the reading-out light RL is projected onto the bottom surface of the light image memory 31-1 by the image reading-out light RL.

The image memory plate 31 is mounted detachably in the holding member 33 so that the electrodes 32 thereof are connected to the connector 34 of the holding member 34 which is connected to the writing-in power source 16 or the erasing power source 17 through the switch 18, and then, the power source 16 or 17 supplies a predetermined voltage to the transparent electrodes 12a and 12b of the image memory plate 31. Since the image memory plate 31 is mounted detachably in the holding member 33 which is arranged in the main body of the copying machine, the image memory plate 31 can be easily exchanged for another image memory plate, for example, if the storage characteristics of the light image memories 31-1 to 31-n deteriorate. Furthermore, the image memory plate 31 can be easily exchanged for another sort of image memory plate, such as an image memory plate comprising a different number of light image memories, an image memory plate comprising light image memories having different sensitivity characteristics, etc. It is to be noted that the top and bottom surfaces of the holding member 33 are coated with black color paint so as to absorb light.

Figure 6:
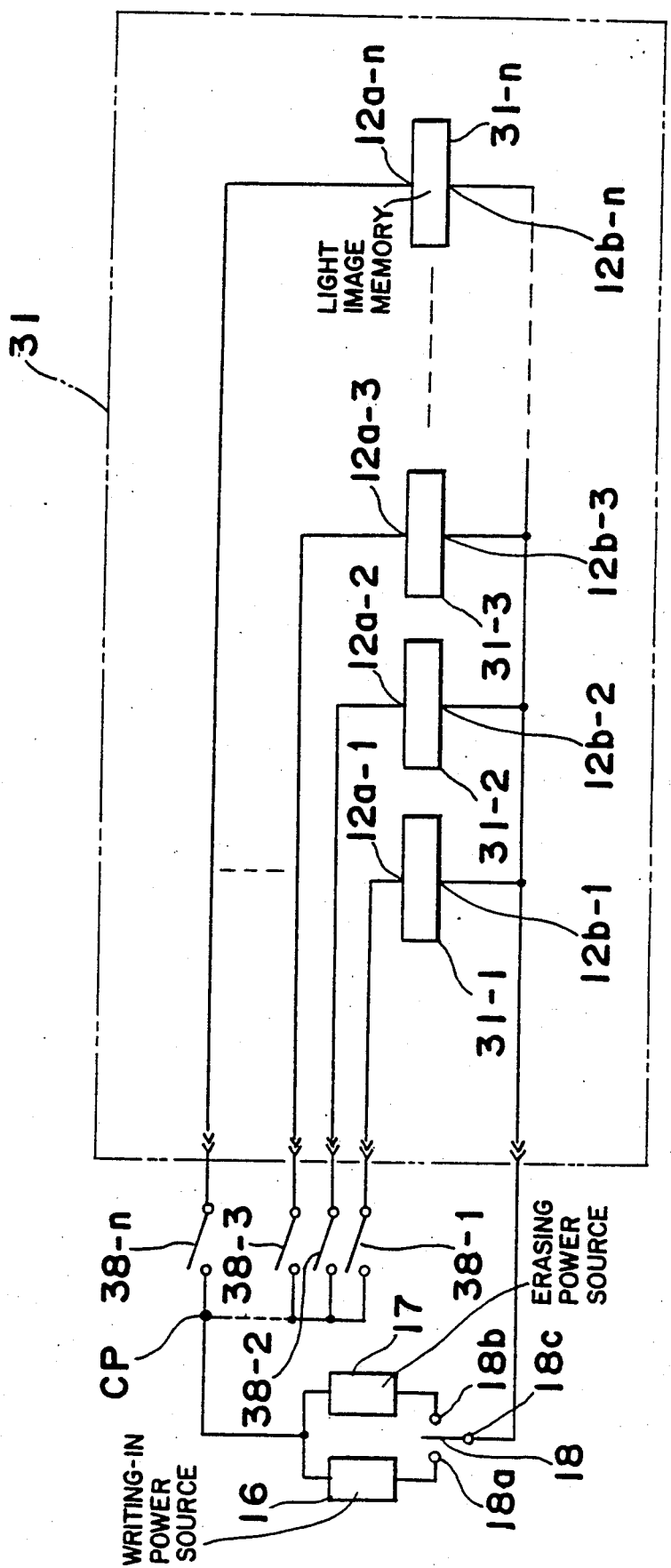
FIG. 6 is a circuit diagram of the image memory plate shown in FIG. 4.

FIG. 6 shows an electric circuit of the image memory plate 31.

Referring to FIG. 6, a transparent electrode 12a-1 of the light image memory 31-1 is connected to a connecting point CP through a switch 38-1, a transparent electrode 12a-2 of the light image memory 31-2 is connected to the connecting point CP through a switch 38-2, and similarly, a transparent electrode 12a-n of the light image memory 31-n is connected to the connecting point CP through a switch 38-n. The connecting point CP is connected to terminals of the writing-in power source 16 and the erasing power source 17. On the other hand, respective transparent electrodes 12b-1 to 12b-n of the light image memories 31-1 to 31-n are connected together to the common terminal 18c of the switch 18.

When image information is written in one of the light image memories 31-1 to 31-n, only one of the switches 38-1 to 38-n corresponding to a selected one of the light image memories 31-1 to 31-n is turned ON, and the switch 18 is switched over so that the common terminal 18c thereof is connected to the terminal 18a thereof, and then, the writing-in power source 16 applies a predetermined direct-current voltage to the transparent electrodes of the selected one of the light image memories 31-1 to 31-n. On the other hand, when the image information written in the light image memories 31-1 to 31-n is erased, all of the switches 38-1 to 38-n are turned ON, and the switch 18 is switched over so that the common terminal 18c thereof is connected to the terminal 18b thereof, and then, the erasing power source 17 applies a predetermined alternating-current voltage to the transparent electrodes of all of the light image memories 31-1 to 31-n.

Figure 7:
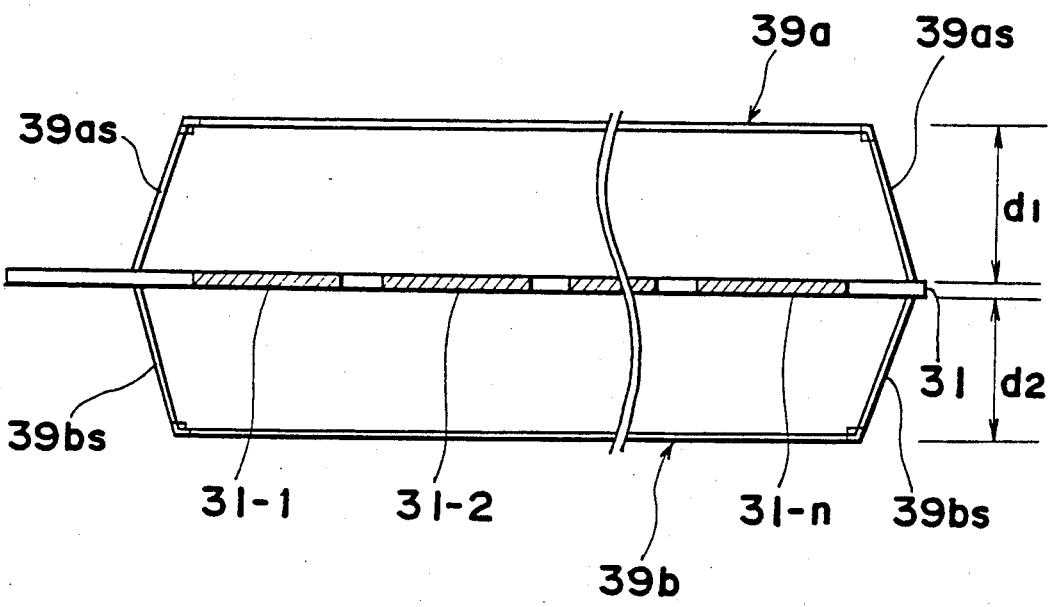
FIG. 7 is a longitudinal sectional view showing the image memory plate covered by protection covers of the preferred embodiment according to the present invention.
Figure 8:
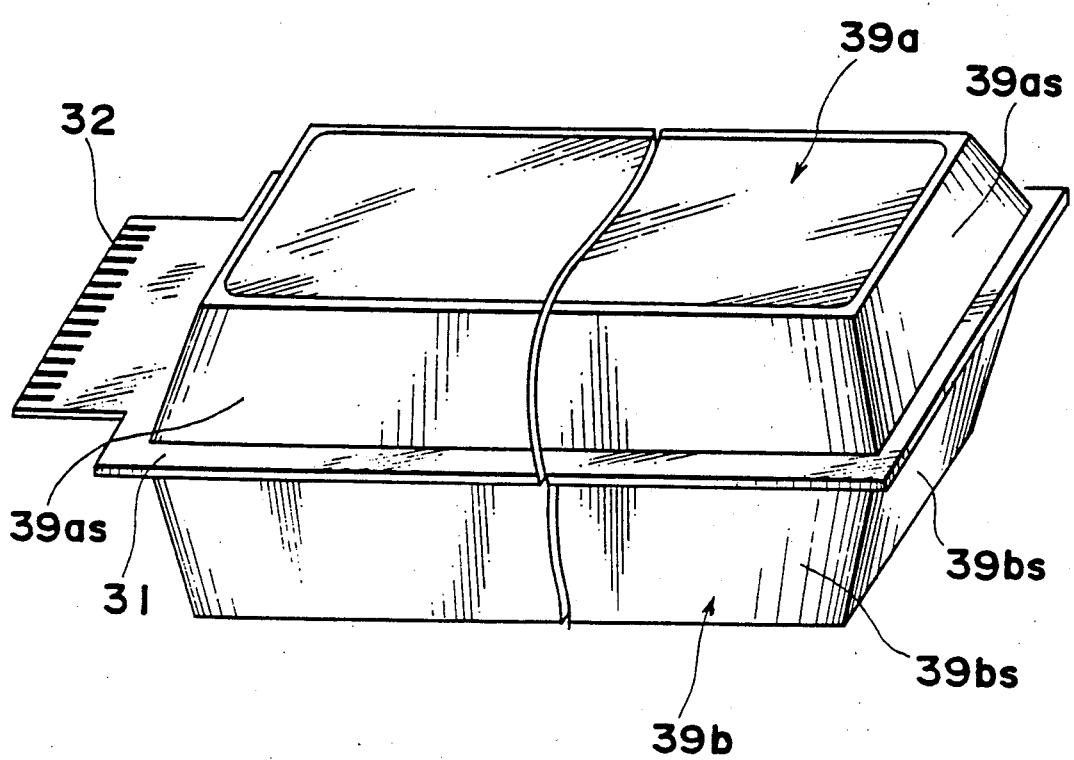
FIG. 8 is a perspective view showing the image memory plate covered by the protection covers shown in FIG. 7.

Referring to FIGS. 7 and 8, in order to prevent a foreign matter such as dust, etc., from adhering to the top and bottom surfaces of the light image memories 31-1 to 31-n, an upper protection cover 39a is arranged on the top surface of the image memory plate 31 so as to cover almost the whole top surface thereof except for the electrodes 32, and a lower protection cover 39b is arranged on the bottom surface of the image memory plate 31 so as to cover almost the whole bottom surface thereof except for the electrodes 32. The upper and lower protection covers 39a and 39b have an approximately rectangular parallelopiped box shape, and are made of light transparent material such as glass, synthetic resin film, plastic resin wherein light passing through the covers 39a and 39b has a wavelength band which is sensitive to the light image memories 31-1 to 31-n. The upper and lower protection covers 39a and 39b are arranged so as to protect the top and bottom surfaces of the light image memories 31-1 to 31-n. The height $d_1$ of the upper protection cover 39a is equal to or larger than the depth of field of the lens 27 of the image writing-in optical system, and the height $d_2$ of the lower protection cover 39b is equal to or larger than the depth of field of the lens of the image reading-out optical system. Therefore, even though dust etc. adheres to the protection covers 39a and 39b, the dust can be prevented from influencing images formed on the top surface of the light image memories 31-1 to 31-n, and the surface of the photoconductive drum 4. The heights $d_1$ and $d_2$ are preferably about 2 to 30 mm.

It is to be noted that a photographic filter suitable for the sensitivity characteristics of the photoconductive layer 13 of the light image memories 31-1 to 31-n may be mounted on the top surface of the upper protection cover 39a, and a photographic filter suitable for the sensitivity characteristics of the photoconductive drum 4 may be mounted on the bottom surface of the lower protection cover 39b. A heat absorbing filter for absorbing heat radiated from the above optical systems may be mounted thereon. Furthermore, respective side portions 39as and 39bs of the upper and lower protection covers 39a and 39b may be constituted by a light opaque material, and then, stray light can be prevented from entering the light image memories 31-1 to 31-n.

Referrring back to FIG. 3, the photoconductive drum 4 is arranged at the lower portion of the main body of the copying machine, and a photoconductive layer is formed on the surface of the photoconductive drum 4. Around the photoconductive drum 4, there are arranged a corona charger 41, a development unit 42, a transfer charger 43, etc. After the surface of the photoconductive drum 4 is uniformly electrified by the corona charger 41, it is exposed to light projected by the image reading-out optical system. The image reading-out optical system comprises a light source 51, mirrors 52 and 53, and a lens 54 which are arranged below the image storage unit 3. In the image reading-out optical system, light projected by the light source 51 is reflected by the bottom surface of one of the light image memories 31-1 to 31-n of the image memory plate 31, and the reflected light from the image memory plate 31 is projected onto the surface of the photoconductive drum 4 through the mirror 52, the lens 54, and the mirror 53 so as to form an electrostatic latent image thereon. Thereafter, the electrostatic latent image is developed by the development unit 42 into a visible toner image with toner. A paper feeding cassette 61 for feeding copying papers is arranged at the left side portion of the main body of the copying machine, and a copying paper is fed from the paper feeding cassette 61 to the transfer charger 43 by a pick-up roller 64 and feeding rollers 65. After the transfer charger 43 transfers the visible toner image onto the copying paper, the copying paper is fed to the fixing unit 62 in order to fix the visible toner image thereon, and then, is discharged to a paper discharging tray 63 arranged at the left side portion of the main body of the copying machine and above the paper feeding cassette 61.

(4) Action of Copying Machine with Light Image Memory

An action of the copying machine in the case of copying plural documents continuously, i.e., producing plural copies of many documents will be described below with reference to the drawings. In this case, first of all, the document reflected light having image information of each document is projected onto the top surface of respective light image memories 31-1 to 31-n so as to write the image information of each document therein, respectively, and thereafter, the image information of each document written in respective light image memories 31-1 to 31-n is read out as reflected light by projecting light onto the bottom surface thereof, and the images of respective documents are formed on copying papers by the reflected light from respective light image memories 31-1 to 31-n, respectively, wherein n is the number of the documents.

When the image information is written in respective light image memories 31-1 to 31-n, the switch 18 is switched over so that the common terminal 18c thereof is connected to the terminal 18a thereof, and one of the switches 38-1 to 38-n is turned ON in order. For example, first of all, after only the switch 38-1 is turned ON and the other switches 38-2 to 38-n are turned OFF, the reflected light from the first document is projected onto the top surface of the light image memory 31-1 of the image memory plate 31 so as to write the image information of the first document therein. Thereafter, the holding member 33 is moved in the direction indicated by the arrow A as shown in FIGS. 3 and 5 by a distance between the adjacent light image memories (referred to as a step distance hereinafter).

Next, after only the switch 38-2 is turned ON and the other switches 38-1 and 38-3 to 38-n are turned OFF, the reflected light from the second document is projected onto the top surface of the light image memory 31-2 of the image memory plate 31 so as to write the image information of the second document therein.

Similarly, after the copied document is exchanged for the next document by the ADF 2 and the image memory plate 31 is moved in the direction indicated by the arrow A by the step distance, the reflected light from each document is projected onto the top surface of each light image memory 31-3 to 31-n so as to write the image information of each document therein, respectively, and then, the image writing-in process is completed. It is to be noted that, in the aforementioned image writing-in process, since the top surface of the frame member 31a of the image memory plate 31 absorbs light, light reflected by the frame member 31a can be prevented from projecting onto the light image memories 31-1 to 31-n as stray light, resulting in that the image information of each document can be written in the light image memories 31-1 to 31-n properly.

Next, in the case that the image information of respective documents written in the light image memories 31-1 to 31-n of the image memory plate 31 is read out and the image of the written image information is formed on a copying paper, after the holding member 33 is moved in the direction indicated by the arrow B so as to return to the reference position thereof, the image information of respective documents is read out in order from the light image memories 31-1 to 31-n, and then, respective images corresponding to the read-out image information are formed on copying papers, respectively. In the image reading-out process, the holding member 33 is moved in the direction indicated by the arrow A so that the image information written in the light image memories 31-1 to 31-n is scanned, and then, the reflected light from each light image memory 31-1 to 31-n is projected onto the surface of the photoconductive drum 4 by the image reading-out optical system, so as to form an electrostatic latent image of the image information thereon. Thereafter, an image corresponding to the latent image is formed on a copying paper in a known photographic copying process. In the above process, the moving velocity of the holding member 33 in the direction indicated by the arrow A is set according to the rotation speed of the photoconductive drum 4 and the magnification for copying.

In the case that a copy of plural documents is produced, the holding member 33 is moved continuously in the direction indicated by the arrow A, and then, each image information written in the light image memories 31-1 to 31-n is read out in order by the image reading-out optical system so that the image of each image information is formed on a copying paper as described above. Furthermore, in the case that plural copies of a document are produced, after the holding member 33 is moved to the position of the light image memory 31-n, the holding member 33 is moved in the direction indicated by the arrow B so as to return to the reference position thereof, and then, the holding member 33 is moved in the direction indicated by the arrow A again so as to form the image of each image information on a copying paper as described above.

Since the frame member 31a of the image memory plate 31 reflects light, when the reflected light from each light image memory 31-1 to 31-n is projected onto the surface of the photoconductive drum 4 so as to form an electrostatic latent image thereon, the charge in the circumference of the portion on the surface of the photoconductive drum 4 where the electrostatic latent image is formed (corresponding to the frame member 31a) is canceled, resulting in that toner can be prevented from adhering to the above portion.

Since the holding member 33 is moved continuously in the direction indicated by the arrow A so as to continuously form respective images of plural documents on copying papers, respectively, the processing time for producing a copy of plural documents becomes shorter than that of the conventional copying machine. Furthermore, in the case that plural copies of a set of documents are produced, since the images of each set of documents are respectively formed on the copying papers every set of documents and each set of copying papers is discharged to one paper discharging tray 63, it is not necessary to provide a sorter etc., resulting in that the copying machine can be prevented from becoming larger. Furthermore, since it is not necessary to circulate the documents many times, the documents can be prevented from being damaged.

Thereafter, in the case that the image information written in the light image memories 31-1 to 31-n is erased, all the switches 38-1 to 38-n are turned ON, the switch 18 is switched over so that the common terminal 18c thereof is connected to the terminal 18b thereof so that a predetermined alternating-current voltage is applied to the transparent electrodes of the light image memories 31-1 to 31-n, and the erasing lamp 28 is turned ON, and then, the image information written in the light image memories 31-1 to 31-n is erased.

As described above, an image of a document is formed on a copying paper by using the light image memories 31-1 to 31-n. It is to be noted that, in the present preferred embodiment, the electrophotographic photoconductive drum 4 comprising the photoconductive layer is used as the photoconductive body, however, another sort of photoconductive body such as a media sheet coated with microcapsules including a photohardening material and colorless dyes may be used. Since the microcapsules onto which light is projected harden in the media sheet, an image receiving sheet coated with developer is superimposed on the media sheet and a pressure is applied thereto by using a pressing roller, and then, the microcapsules which are not hardened are broken, and colorless dyes flow out therefrom onto the developer of the image receiving sheet so as to form a colored image thereon. Therefore, in this case, since the microcapsules in the circumference of the image forming portion of the media sheet (the portion corresponding to the light image memories 31-1 to 31-n) harden in accordance with the light reflected by the frame member 31a, the microcapsules can be prevented from being broken unnecessarily. Furthermore, stain can be prevented from adhering to the formed image on the copying paper, and also the inside of the main body of the copying machine can be prevented from becoming dirty.

In the case that a negative image is formed, for example, an image is formed by using a photoconductive body having a photoconductive layer, when toner is made to adhere to a portion where the charge is canceled, a negative image comprised of reversed white image and reversed black image can be obtained. In this case, the surface of the frame member 31a of the image memory plate 31 may be made of a light absorbing material, and then, toner can be prevented from adhering to the circumference of the image forming portion.

It is to be understood that various other modifications will be apparent to and can be readily made by those skilled in the art without departing from the scope and spirit of the present invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which the present invention pertains.

What is claimed is:

1. An image forming apparatus comprising:
   an image memory plate having a light image memory for storing image information of a document when reflected light having the image information from the document is projected onto a first surface thereof, and for reading out the image information stored therein in the form of reflected light when light is projected onto a second surface thereof by a light source;
   holder means for detachably holding said image memory plate;
   moving means for moving said holder means so as to project the reflected light from the document onto first surface of said light image memory and to project the light from said light source onto said second surface of said light image memory; and
   image formation means for forming the image of the image information onto a paper in accordance with the reflected light from said light image memory.

2. The image forming apparatus as claimed in claim 1, wherein said image formation means comprises:
   latent image formation means for forming an electrostatic latent image corresponding to the reflected light from said light image memory on a photoconductive body;
   development means for developing the electrostatic latent image formed on said photoconductive body into a visible toner image with toner;
   transfer means for transferring the visible toner image formed on said photoconductive body onto the paper; and
   fixing means for fixing the visible toner image transferred onto the paper.

3. The image forming apparatus as claimed in claim 1, wherein said image memory plate comprises a plurality of said light image memories and said moving means selectively moves said holder means so as to project the reflected light from the document onto a first surface of a selected one of said plural light image memories and to project the light from said light source onto a second surface of a selected one of said plural light image memories.

4. The image forming apparatus as claimed in claim 1, wherein said light image memory comprises:
   a first transparent substrate defining said first surface of said light image memory;
   a first transparent electrode formed on said first transparent substrate;
   a photoconductive layer formed on said first transparent electrode;
   a reflection layer for reflecting the light from said light source, said reflection layer being formed on said photoconductive layer;
   a second transparent substrate defining said second surface of said light image memory;
   a second transparent electrode formed on said second transparent substrate; and
   an image storage layer for storing the image information, said image storing layer being arranged between said reflection layer and said second transparent electrode.

5. The image forming apparatus as claimed in claim 4, wherein said image storage layer is made of liquid crystal.

6. The image forming apparatus as claimed in claim 4, wherein said image storage layer is made of an electrochromic material.

7. The image forming apparatus as claimed in claim 4, wherein said image storage layer is made of PLZT.

8. An image forming apparatus comprising:
   an image memory plate having a light image memory for storing image information of a document when reflected light having the image information from the document is projected onto a first surface thereof through a first lens, and for reading out the image information stored therein in the form of reflected light when light is projected onto a second surface thereof by a light source;
   holder means for detachably holding said image memory plate;
   moving means for moving said holder means so as to project the reflected light from the document onto said first surface of said light image memory and to project the light from said light source onto said second surface of said light image memory;
   image formation means for forming the image of the image information onto a paper in accordance with the reflected light from said light image memory through a second lens;
   first transparent protection cover means for protecting said first surface of said light image memory, said first transparent protection cover means being arranged at a distance from said first surface of said light image memory greater than the depth of field of said first lens; and
   second transparent protection cover means for protecting said second surface of said light image memory, said second transparent protection cover means being arranged at a distance from said second surface of said light image memory greater than the depth of field of said second lens.

9. The image forming apparatus as claimed in claim 8, wherein said image formation means comprises:
   latent image formation means for forming an electrostatic latent image corresponding to the reflected light from said light image memory on a photoconductive body;
   development means for developing the electrostatic latent image formed on said photoconductive body into a visible toner image with toner;
   transfer means for transferring the visible toner image formed on said photoconductive body onto the paper; and
   fixing means for fixing the visible toner image transferred onto the paper.

10. The image forming apparatus as claimed in claim 8, wherein said image memory plate comprises a plurality of said light image memories and said moving means selectively moves said holder means so as to project the reflected light from the document onto a first surface of a selected one of said plural light image memories and to project the light from said light source onto a second surface of a selected one of said plural light image memories.

11. The image forming apparatus as claimed in claim 8, wherein said light image memory comprises:
   a first transparent substrate defining the said first surface of said light image memory;
   a first transparent electrode formed on said first transparent substrate;
   a photoconductive layer formed on said first transparent electrode;

a reflection layer for reflecting the light from said light source, said reflection layer being formed on said photoconductive layer;

a second transparent substrate defining said second surface of said light image memory;

a second transparent electrode formed on said second transparent substrate; and an image storage layer for storing the image information, said image storing layer being arranged between said reflection layer and said second transparent electrode.

12. The image forming apparatus as claimed in claim 11, wherein said image storage layer is made of liquid crystal.

13. The image forming apparatus as claimed in claim 11, wherein said image storage layer is made of an electrochromic material.

14. The image forming apparatus as claimed in claim 11, wherein said image storage layer is made of PLZT.

15. An image forming apparatus comprising:

an image memory plate having a frame member and a light image memory for storing image information of a document when reflected light having the image information from the document is projected onto a first surface of said light image memory corresponding to a first side of said frame member thereof, and for reading out the image information stored therein in the form of reflected light when light is projected onto a second surface of said light image memory corresponding to a second side of said frame member thereof by a light source, said light image memory being mounted in said frame member, a surface of said frame member on said second side being made of a light reflection material;

holder means for detachably holding said image memory plate;

moving means for moving said holder means so as to project the reflected light from the document onto said first surface of said light image memory and to project the light from said light source onto said second surface of said light image memory; and image formation means for forming the image of the image information onto a paper in accordance with the reflected light from said light image memory.

16. The image forming apparatus as claimed in claim 15, wherein said image formation means comprises:

latent image formation means for forming an electrostatic latent image corresponding to the reflected light from said light image memory on a photoconductive body;

development means for developing the electrostatic latent image formed on said photoconductive body into a visible toner image with toner;

transfer means for transferring the visible toner image formed on said photoconductive body onto the paper; and fixing means for fixing the visible toner image transferred onto the paper.

17. The image forming apparatus as claimed in claim 15, wherein said image memory plate comprises a plurality of said light image memories and said moving means selectively moves said holder means so as to project the reflected light from the document onto a first surface of a selected one of said plural light image memories and to project the light from said light source onto a second surface of a selected one of said plural light image memories.

18. The image forming apparatus as claimed in claim 15, wherein said light image memory comprises:

a first transparent substrate defining said first surface of said light image memory;

a first transparent electrode formed on said first transparent substrate;

a photoconductive layer formed on said first transparent electrode;

a reflection layer for reflecting the light from said light source, said reflection layer being formed on said photoconductive layer;

a second transparent substrate defining said second surface of said light image memory;

a second transparent electrode formed on said second transparent substrate; and an image storage layer for storing the image information, said image storing layer being arranged between said reflection layer and said second transparent electrode.

19. The image forming apparatus as claimed in claim 18, wherein said image storage layer is made of liquid crystal.

20. The image forming apparatus as claimed in claim 18, wherein said image storage layer is made of an electrochromic material.

21. The image forming apparatus as claimed in claim 18, wherein said image storage layer is made of PLZT.

22. A method of operating an image forming apparatus which comprises an image memory plate including a light image memory of first and second opposing surfaces, comprising the steps of:

detachably mounting said image memory plate on movable holder means;

transmitting image information light, reflected from a document, onto said first opposing surface to store the image information therein;

moving said movable holder means and transmitting read light from a light source onto said second opposing surface to be reflected; and forming an image of the image information on a copy medium in accordance with said reflected read light.

23. The method of operating an image forming apparatus as claimed in claim 22, wherein said step of forming an image of the image information comprises the steps of:

forming an electrostatic latent image corresponding to said reflected read light on a photoconductive body;

developing the electrostatic latent image formed on said photoconductive body into a visible toner image with toner;

transferring the visible toner image formed on said photoconductive body onto said copy medium; and fixing the visible toner image transferred onto said copy medium.

24. The method of operating an image forming apparatus as claimed in claim 22, wherein said image memory plate comprises a plurality of said light image memories, further comprising the step of:

selectively moving said holder means so as to project said image information light from the document onto a first opposing surface of a selected one of said plural light image memories and to project said read light onto a second opposing surface of a selected one of said plural light image memories.

25. An image forming apparatus comprising:

image memory plate means having a light image memory of first and second opposing sides for storing image information of a document;

holder means for detachably holding said image memory plate means;

moving means for moving said holder means to project a reflected writing light from said document onto said first opposing surface and to project a read light onto said second opposing surface; and transparent protection cover means, for protecting said light image memory, arranged at respective distances from said first and second opposing surfaces greater than the depth of field of respective write and read lenses.

26. The image forming apparatus of claim 25 wherein said image memory plate is coated with a light absorbing material on a first surface thereof corresponding to said first opposing surface and is coated with a reflecting material on a second surface thereof corresponding to said second opposing surface.

27. The image forming apparatus of claim 26 wherein said image memory plate includes plural light image memories, said moving means moving said holder means to project said reflected writing light onto a first opposing surface of a selected one of said plural light image memories and to project said read light onto a second opposing surface of a selected one of said plural light image memories.

28. The image forming apparatus of claim 25 wherein said transparent protection cover means comprises a first transparent unit for protecting said first opposing surface and a second transparent unit for protecting said second opposing surface.

29. The image forming apparatus of claim 28 further comprising a first photographic filter suitable for sensitivity characteristics of said light image memory mounted on a surface of said first transparent unit and a second photographic filter suitable for sensitivity characteristics of an image formation means, which forms an image of said document based upon reflected read light, said second photographic filter mounted on a surface of said second transparent unit for improving said formed image of said document.

30. The image forming apparatus of claim 25 further comprising a heat absorbing filter mounted on said transparent protection cover for reducing the amount of heat dissipated to said light image memory.

* * * * *